(12) United States Patent  (10) Patent No.: US 9,331,583 B2
Zhang et al.  (45) Date of Patent: May 3, 2016

(54) SWITCH MODE POWER SUPPLY, CONTROL CIRCUIT AND ASSOCIATED CONTROL METHOD

(71) Applicant: Chengdu Monolithic Power Systems Co., Ltd., Chengdu (CN)

(72) Inventors: Junming Zhang, Hangzhou (CN); Hao Long, Hangzhou (CN); Hui Li, Hangzhou (CN)

(73) Assignee: Chengdu Monolithic Power Systems Co., Ltd., Chengdu (CN)

( * ) Notice: Subject to any disclaimer, the term of this patent is extended or adjusted under 35 U.S.C. 154(b) by 172 days.

(21) Appl. No.: 14/139,601

(22) Filed: Dec. 23, 2013

(65) Prior Publication Data

US 2014/0177290 A1  Jun. 26, 2014

(30) Foreign Application Priority Data

Dec. 24, 2012 (CN) .......................... 2012 1 0567105

(51) Int. Cl.
*H02M 3/335* (2006.01)
*H02M 1/00* (2006.01)

(52) U.S. Cl.
CPC .. *H02M 3/33507* (2013.01); *H02M 2001/0032* (2013.01); *Y02B 70/16* (2013.01)

(58) Field of Classification Search
CPC ................ H02M 3/33507; H02M 2001/0032; Y02B 70/16
USPC .............................................. 363/21.12–21.18
See application file for complete search history.

(56) References Cited

U.S. PATENT DOCUMENTS

| | | | |
|---|---|---|---|
| 8,274,801 B2 | 9/2012 | Zhang | |
| 2008/0084723 A1* | 4/2008 | Balakrishnan et al. | 363/97 |
| 2008/0310194 A1* | 12/2008 | Huang et al. | 363/21.18 |
| 2009/0284994 A1* | 11/2009 | Lin et al. | 363/21.13 |
| 2011/0084677 A1* | 4/2011 | Shi et al. | 323/284 |

* cited by examiner

*Primary Examiner* — Jue Zhang
(74) *Attorney, Agent, or Firm* — Perkins Coie LLP

(57) ABSTRACT

A switch mode power supply having an output terminal configured to provide an output voltage, the switch mode power supply has a first switch and a control circuit. The control circuit is configured to provide a switching control signal to control the first switch. The control circuit is configured to provide the switching control signal based on a first pulse signal having a first frequency and a second frequency for a light load condition, and the control circuit is configured to provide the switching control signal based on a second pulse signal for a non-light load condition.

19 Claims, 9 Drawing Sheets

SWITCH MODE POWER SUPPLY, CONTROL CIRCUIT AND ASSOCIATED CONTROL METHOD

CROSS-REFERENCE TO RELATED APPLICATION(S)

This application claims the benefit of CN application No. 201210567105.6, filed on Dec. 24, 2012, and incorporated herein by reference.

TECHNICAL FIELD

The present invention relates to electrical circuit, more particularly but not exclusively relates to switch mode power supply.

BACKGROUND

With development of electronic technology, switch mode power supply is widely used in electronic devices per smaller, lighter and more efficient. There are many circuit topologies for switch mode power supply, such as buck, boost, half-bridge, flyback and so on. Taking flyback topology as an example, the switch mode power supply has the following functional modules: an energy input module, an energy coupled module, an energy output module, a feedback module and a controlling module. An alternative current ("AC") voltage is input through the energy input module and transformed into a smooth direct current ("DC") voltage, which is further transformed into a high frequency signal through periodically turning ON and turning OFF a switch based on a feedback signal. The high frequency signal is coupled by a transformer and a steady DC voltage is output through the output module.

Besides a normal operating mode, electronic devices can also operate under a reduced load or standby mode (generally referred to as "light load"). Under light load conditions, a load needs very low power output from the power supply. If the controlling module still uses an original frequency to drive the switch, loss on the switch becomes significant and efficiency becomes low. One traditional solution is decreasing the frequency to a lower level. However, the frequency will below 20 KHz with the load becomes lighter. Thus, the frequency is in an audible frequency range to cause noise issues. As a result, an improved control circuit for switch mode power supply to avoid audible noise and achieve high efficiency is needed.

SUMMARY

It is one of the objects of the present invention to provide switch mode power supply, control circuit and associated control method to resolve one or more technical problems.

One embodiment of the present invention discloses a control circuit for a switch mode power supply, the switch mode power supply comprises a first switch having a control terminal, wherein the control circuit comprises: a mode management unit configured to provide a mode control signal; a skip cycle mode control unit configured to provide a first pulse signal based on a low-frequency pulse signal having a first frequency, wherein the first pulse signal has the first frequency and a second frequency, and the second frequency is higher than the first frequency, and wherein a duty cycle of the low-frequency pulse signal varies with a load condition; a normal mode control unit configured to provide the second pulse signal; and a drive signal management unit configured to provide a switching control signal to the control terminal of the first switch based on the first pulse signal, the second pulse signal and the mode control signal.

Another embodiment of the present invention discloses a switch mode power supply, wherein the switch mode power supply may comprise a first switch, and the control circuit described above.

Yet another embodiment of the present invention discloses a control method for a switch mode power supply, the switch mode power supply comprises a first switch, wherein the control method comprises: comparing a switching frequency of the first switch with a frequency threshold; when the switching frequency of the first switch is less than the frequency threshold, the switch mode power supply works in a skip cycle mode, the first switch is controlled based on a first pulse signal, wherein the first pulse signal has a first frequency and a second frequency, and wherein the second frequency is higher than the first frequency; when the switching frequency of the first switch is higher than the frequency threshold, the switch mode power supply works in a normal mode, the first switch is controlled based on a second pulse signal, wherein the second pulse signal has a third frequency, and wherein the third frequency is higher than the second frequency; and wherein when the switch mode power supply works in the skip cycle mode, the first pulse signal is provided based on a low-frequency pulse signal having the first frequency, wherein the low-frequency pulse signal is generated based on a load condition.

In one embodiment, the first frequency and the second frequency are predetermined, and as a result, the switching frequency of the first switch may be kept within a predetermined range to avoid audible noise for a skip cycle mode operation. With embodiments of the present invention, it is flexible to achieve high efficiency and avoid audible noise.

BRIEF DESCRIPTION OF THE DRAWINGS

Non-limiting and non-exhaustive embodiments are described with reference to the following drawings.

DETAILED DESCRIPTION

In the present application, numerous specific details are provided, such as examples of circuits, components, and methods, to provide a thorough understanding of embodiments of the invention. These embodiments are exemplary, not to confine the scope of the invention. Persons of ordinary skill in the art will recognize, however, that the invention can be practiced without one or more of the specific details. In other instances, well-known details are not shown or described to avoid obscuring aspects of the invention. Some phrases are used in some exemplary embodiments. However, the usage of these phrases is not confined to these embodiments.

Several embodiments of the present invention are described below with reference to switch mode power supply, control circuit and associated control method. As used hereinafter, the term "couple" generally refers to multiple ways including a direct connection with an electrical conductor and an indirect connection through intermediate diodes, resistors, capacitors, and/or other intermediaries.

Flyback converter is taken as one example hereinafter, but one of ordinary skill in the art should understand that any suitable topology may be adopted, such as step-down (buck) converter, step-up (boost) converter, buck-boost converter, flyback converter, forward converter and so on.

Figure 1:
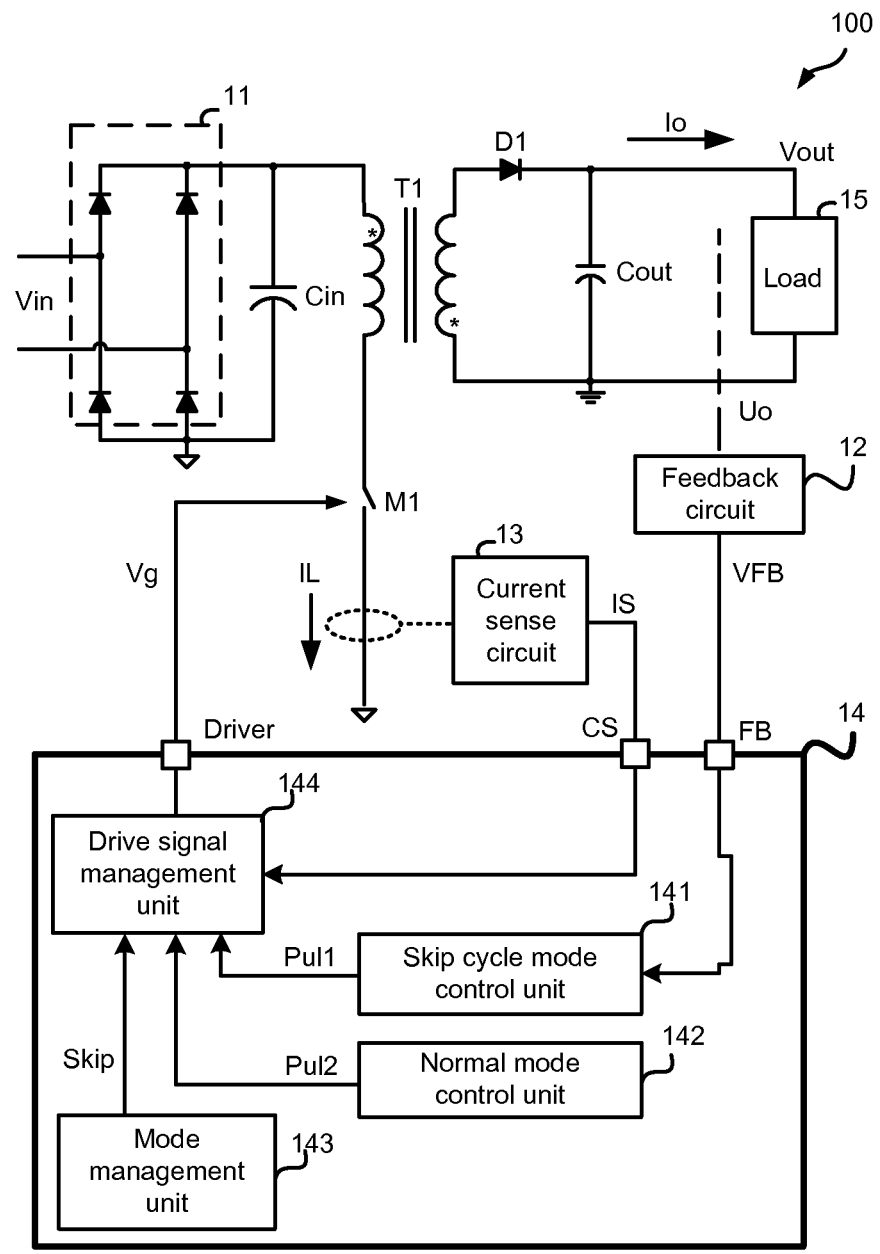
FIG. 1 schematically illustrates a circuit block diagram of a switch mode power supply 100 according to an embodiment of the present invention.

FIG. 1 schematically illustrates a circuit block diagram of a switch mode power supply 100 according to an embodiment of the present invention. As shown in FIG. 1, switch mode power supply 100 comprises a bridge rectifier 11, an input capacitor Cin, a transformer T1, a switch M1, a diode D1, an output capacitor Cout, a feedback circuit 12, a current sense circuit 13 and a control circuit 14. Bridge rectifier 11 is configured to receive an alternating input voltage Vin and is configured to provide a direct input voltage across input capacitor Cin. One terminal of input capacitor Cin is coupled to a first terminal of a primary winding of transformer T1, the other terminal of input capacitor Cin is couple to a primary ground. Switch M1 is coupled between a second terminal of the primary winding of transformer T1 and the primary ground. Diode D1 comprises an anode and a cathode, wherein the anode is coupled to a first terminal of a secondary winding of transformer T1, and the cathode is coupled to one terminal of output capacitor Cout. The other terminal of output capacitor Cout is coupled to a second terminal of the secondary winding of transformer T1. In one embodiment, the second terminal of the secondary winding of transformer T1 is coupled to the secondary ground. A voltage across output capacitor Cout is an output voltage Vout. In one embodiment, diode D1 may be replaced by a synchronous rectifier. Switch M1 may be any suitable semiconductor switching device, such as Metal Oxide Semiconductor Field Effect Transistor (MOSFET), Insulated Gate Bipolar Translator (IGBT) and so on. Switch M1 comprises a control terminal configured to receive a switching control signal Vg. Switch M1 is turned ON and/or turned OFF by switching control signal Vg to regulate an output signal Uo, which can be output voltage Vout or an output current Io. In one embodiment, transformer T1 is configured to store energy when switch M1 is turned ON, and is configured to transfer energy to a secondary side of transformer T1 when switch M1 is turned OFF. Feedback circuit 12 samples output signal Uo, e.g., samples output voltage Vout or samples output current Io, and outputs a feedback signal VFB. Feedback signal VFB can be any type of signal which can reflect a condition of a load 15, such as a voltage signal, a current signal, or a power signal. In one embodiment, feedback circuit 12 may comprise a resistor divider, a capacitor divider, an optocoupler or a transformer. Current sense circuit 13 is configured to provide a current sense signal IS via testing a current IL flowing through switch M1. Current sense circuit 13 may comprise a resistor, a transformer, or a current amplifier.

Control circuit 14 is configured to receive feedback signal VFB via pin FB, receive current sense signal IS via pin CS, and provide switching control signal Vg to the control terminal of switch M1 via pin Driver. Switch M1 is turned ON and OFF by control circuit 14 to regulate output signal Uo. Control circuit 14 may be integrated on an Integrated Circuit (IC). Control circuit 14 comprises a skip cycle mode control unit 141, a normal mode control unit 142, a mode management unit 143 and a drive signal management unit 144.

Skip cycle mode control unit 141 is configured to provide a pulse signal Pul1 based on feedback signal VFB. Normal mode control unit 142 is configured to provide a pulse signal Pul2. Mode management unit 143 is configured to provide mode control signal Skip based on a load condition. Driver management unit 144 is configured to provide switching control signal Vg corresponding to one of pulse signal Pul1 and pulse signal Pul2 based on mode control signal Skip. When mode control signal Skip is in a first state for a light load condition, control circuit 14 controls switch mode power supply 100 to operate in a skip cycle mode, and drive management unit 144 provides switching control signal Vg based on pulse signal Pul1. In one embodiment, pulse signal Pul1 varies with feedback signal VFB. In one embodiment, when switch mode power supply 100 operates in the skip cycle mode, drive management unit 144 is configured to turn ON switch M1 based on pulse signal Pul1 and turn OFF switch M1 based on current sense signal IS. When mode control signal Skip is in a second state for a non-light load condition, control circuit 14 controls switch mode power supply 100 to operate in a normal mode, and drive management unit 144 provides switching control signal Vg based on pulse signal Pul2. In one embodiment, when switch mode power supply 100 operates in the normal mode, drive management unit 144 is configured to turn ON switch M1 based on pulse signal Pul2 and turn OFF switch M1 based on current sense signal IS. In one embodiment, mode management unit 143 is configured to judge the load condition via comparing a switching frequency of switch M1 with a frequency threshold Vth1. When switching frequency of switch M1 is less than frequency threshold Vth1, load 15 is recognized in the light load condition; otherwise, when switching frequency of switch M1 is larger than frequency threshold Vth1, load 15 is recognized in the non-light load condition. In one embodiment, frequency threshold Vth1 is equals to or larger than 20 KHz. In another embodiment, mode management unit 143 judges the load condition via testing other parameters such as output voltage Vout, output current Io.

Switch M1 may be driven based on a conventional pulse width modulation ("PWM") control method with fixed frequency pulse, which can be a voltage mode or a current mode, or a fixed on-time variable off-time control method. For the conventional PWM control method, output signal Uo is regulated via controlling the time period during which switch M1 is ON. For the fixed on-time variable off-time control method, the on-time period of switch M1 is constant, while the time period during which switch M1 is OFF is controlled.

Figure 2:
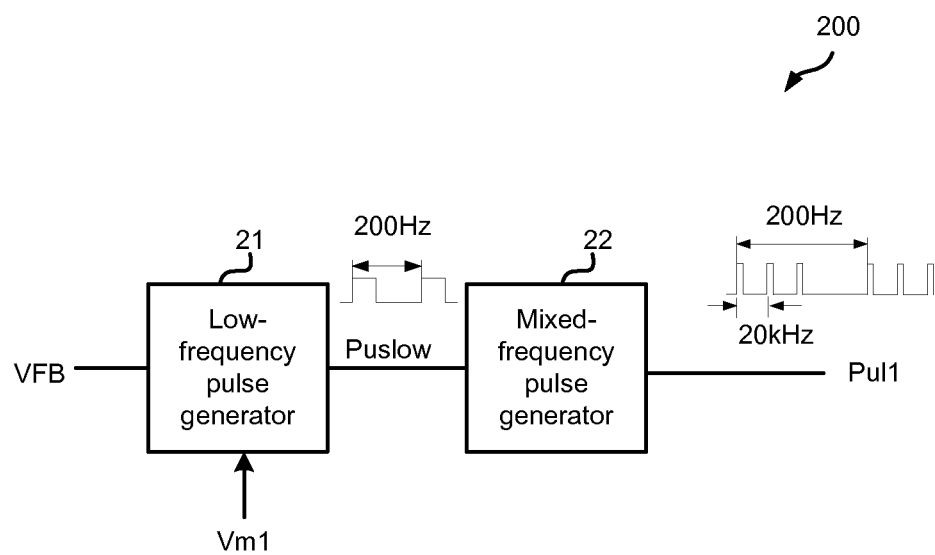
FIG. 2 schematically illustrates a circuit block diagram of a skip cycle mode control unit 200 according to an embodiment of the present invention.

FIG. 2 schematically illustrates a circuit block diagram of a skip cycle mode control unit 200 according to an embodiment of the present invention. Skip cycle mode control unit 200 is configured to provide pulse signal Pul1 based on feedback signal VFB. Skip cycle mode control unit 200 comprises a low-frequency pulse generator 21 and a mix-frequency pulse generator 22.

Low-frequency pulse generator 21 is configured to provide a low-frequency pulse signal Puslow based on feedback signal VFB and a modulation signal Vm1, wherein modulation signal Vm1 has a first frequency. In one embodiment, low-frequency pulse signal Puslow is provided via comparing feedback signal VFB with modulation signal Vm1, and low-frequency pulse signal Puslow has a same frequency with modulation signal Vm1, i.e., the first frequency. When feedback signal VFB is larger than modulation signal Vm1, low-frequency pulse signal Puslow is in a first state, e.g., high voltage level; and when feedback signal VFB is less than modulation signal Vm1, low-frequency pulse signal Puslow is in a second state, e.g., low voltage level. In one embodiment, modulation signal Vm1 comprises a triangle wave signal or a saw-tooth wave signal. In one embodiment, the first frequency is 200 HZ. In another embodiment, the first frequency may be less than a lower limit of an audible frequency range. In one embodiment, feedback signal VFB represents output voltage Vout.

Mix-frequency pulse generator 22 is configured to provide pulse signal Pul1 based on low-frequency pulse signal Puslow, where pulse signal Pul1 has the first frequency and a second frequency, the second frequency is larger than the first frequency. In one embodiment, when low-frequency pulse signal Puslow is in the first state, e.g., high voltage level, pulse signal Pul1 keeps ineffective, e.g., low voltage level; and when low-frequency pulse signal Puslow is in the second state, e.g., low voltage level, pulse signal Pul1 comprises effective pulses with the second frequency. In one embodiment, the second frequency is 20 KHz, corresponding to an upper limit of the audible frequency range. In another embodiment, the second frequency may be larger than the upper limit of the audible frequency range.

Figure 3:
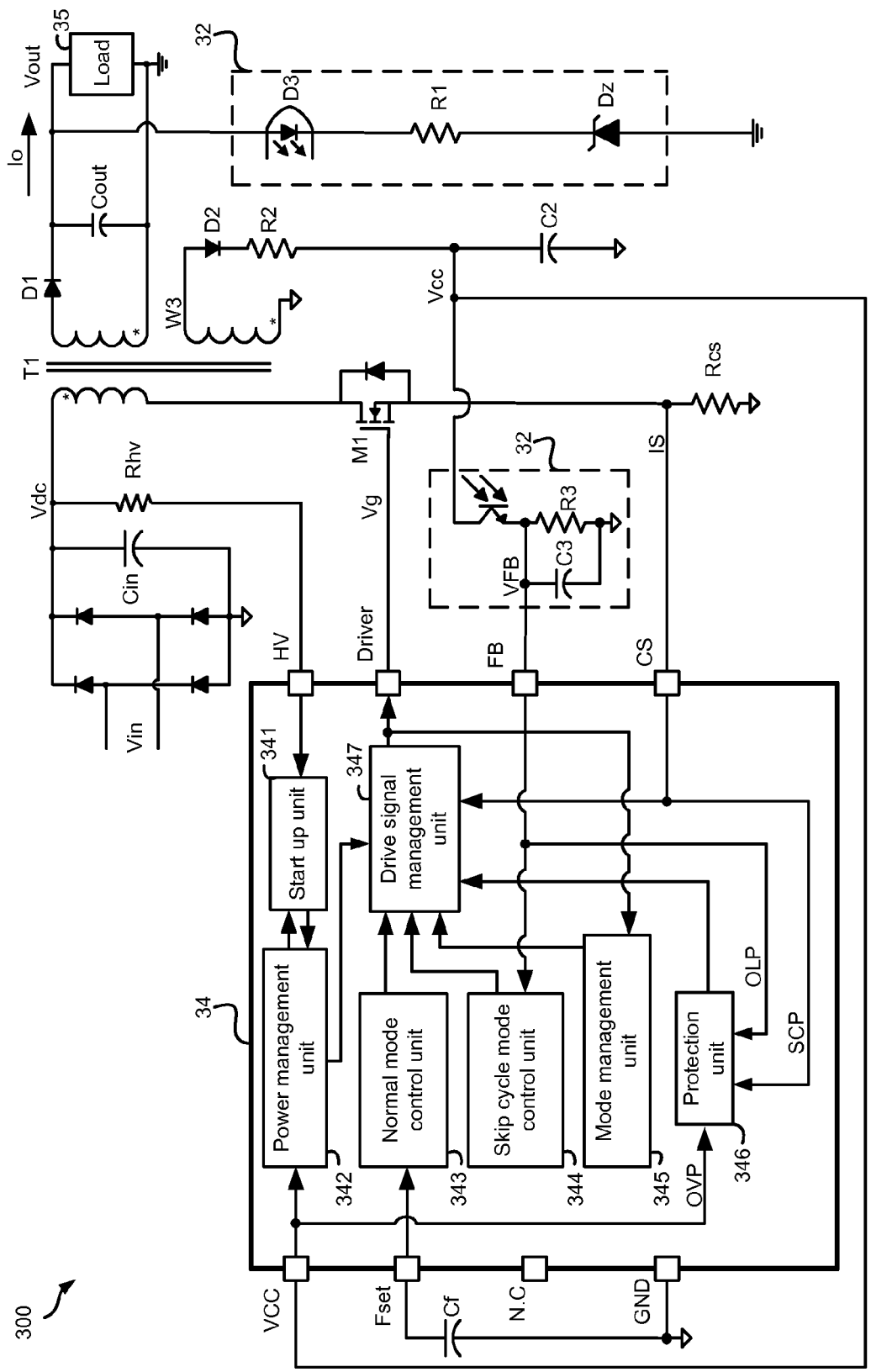
FIG. 3 schematically illustrates a circuit diagram of a switch mode power supply 300 according to an embodiment of the present invention.

FIG. 3 schematically illustrates a circuit diagram of a switch mode power supply 300 according to an embodiment of the present invention. The embodiment shown in FIG. 3 is based on a flyback topology with a fixed on-time variable off-time control method though any other suitable topologies may also be used. The primary winding of transformer T1 is coupled to input voltage Vin through a bridge rectifier, and a voltage on the secondary winding of transformer T1 is rectified by diode D1 and further filtered by capacitor Cout to provide output voltage Vout to a load 35. In the embodiment shown in FIG. 3, switch M1 is an N-channel metal oxide semiconductor field effect transistor (NMOS). Current sense circuit comprises a sense resistor Rcs, drain of switch M1 is coupled to the primary winding of transformer T1 and source of switch M1 is coupled to the primary ground through sense resistor Rcs.

A feedback circuit 32 is coupled to an output terminal of switch mode power supply 300 and provide feedback signal VFB based on output voltage Vout. As shown in FIG. 3, feedback circuit 32 comprises an optocoupler D3, a zener diode DZ, a resistor R1, a resistor R3 and a capacitor C3, wherein a light-emitting diode of optocoupler D3, resistor R1 and Zener diode DZ are coupled in series between the output terminal of switch mode power supply 300 and the secondary ground, a phototransistor of optocoupler D3 and resistor R3 are coupled in series between an auxiliary power supply Vcc and the primary ground, capacitor C3 is coupled to resistor R3 in parallel, one terminal of the phototransistor of optocoupler D3 is coupled to auxiliary power supply Vcc, and the other terminal of the phototransistor of optocoupler D3 is coupled to pin FB to provide feedback signal VFB. One of ordinary skill in the art should understand that feedback circuit 32 may also employ a resistor divider or a capacitor divider to provide feedback signal VFB representing output voltage Vout. In another embodiment, feedback circuit 32 may provide feedback signal VFB through testing a voltage across an auxiliary winding W3 (will be detailed described below).

Switch mode power supply 300 provides auxiliary power supply Vcc to power control circuit 34 through auxiliary winding W3. An auxiliary power supply circuit comprises auxiliary winding W3, a diode D2, a resistor R2 and a capacitor C2. An anode of diode D2 is coupled to one terminal of auxiliary winding W3, and a cathode of diode D2 is coupled to a first terminal of resistor R2. A second terminal of resistor R2 is coupled to a first terminal of capacitor C2, and a second terminal of capacitor C2 is couple to the other terminal of auxiliary winding W3, a voltage across capacitor C2 is auxiliary power supply Vcc. Control circuit 34 is configured to receive auxiliary power supply Vcc through pin VCC.

Control circuit 34 is configured to provide switching control signal Vg to turn ON and turn OFF switch M1 based on feedback signal VFB and current sense signal IS. Control circuit 34 comprises a start up unit 341, a power management unit 342, a normal mode control unit 343, a skip cycle mode control unit 344, a mode management unit 345, a protection unit 346 and a drive signal management unit 347. In the embodiment shown in FIG. 3, control circuit 34 comprises a high voltage input pin HV, a drive pin Driver, a feedback pin FB, a current sense pin CS, an auxiliary power supply pin VCC, a frequency setting pin Fset, a ground pin GND. A capacitor Cf is coupled between frequency setting pin Fset and ground pin GND. In another embodiment, capacitor Cf is integrated into control circuit 34.

Start up unit 341 is employed to power control circuit 34 during start up period of switch mode power supply 300. Start up unit 341 receives rectified voltage signal Vdc through high voltage input pin HV. Start up unit 341 may comprise a high voltage current source or a high voltage transistor. Power management unit 342 is coupled to start up unit 341 and auxiliary power supply pin VCC, and is configured to power drive management unit 347. In one embodiment, at the beginning of start up period of switch mode power supply 300, switch M1 has not entered into normal working state, i.e., normally ON and OFF, the voltage across auxiliary winding W3 has not set up, and power management unit 342 controls start up unit 341 working to charge capacitor C2, e.g., turning on a high voltage current source. Start up unit 341 stops working as soon as the voltage across capacitor C2, i.e., auxiliary power supply Vcc, becomes large enough, and then power supply of control circuit 34 is taken over by auxiliary winding W3.

Normal mode control unit 343 is coupled to frequency setting pin Fset, and is configured to provide pulse signal Pul2 having a third frequency to drive signal management unit 347. The third frequency could be set via adjusting a signal at frequency setting pin Fset. Skip cycle mode control unit 344 is configured to provide pulse signal Pul1 based on feedback signal VFB.

Mode management unit 345 is configured to provide mode control signal Skip based on the load condition. When mode control signal Skip is in the first state for the light load condition, control circuit 34 controls switch mode power supply 300 working in the skip cycle mode, and drive signal management unit 347 is configured to provide switching control signal Vg based on pulse signal Pul1. When mode control signal Skip is in the second state for the non-light load condition, control circuit 34 controls switch mode power supply 300 working in the normal mode, and drive signal management unit 347 is configured to provide switching control signal Vg based on pulse signal Pul2. In the embodiment shown in FIG. 3, mode management unit 345 is configured to provide mode control signal Skip based on switching control signal Vg. In one embodiment, when the switching frequency of switch M1, i.e., a frequency of switching control signal Vg is less than the frequency threshold, mode control signal Skip transits to the first state, and switch mode power supply 300 works in the skip cycle mode; and when the switching frequency of switch M1 is larger than the frequency threshold, mode control signal Skip transits to the second state, and switch mode power supply 300 works in the normal mode. However, one with ordinary skill in the art should understand that any other suitable circuit may be employed to provide mode control signal Skip based on the load condition.

In one embodiment, for a skip cycle mode operation, switching control signal Vg is reset to turn OFF switch M1 when current sense signal IS is larger than a peak current threshold Vcs, and switching control signal Vg is set to turn ON switch M1 when pulse signal Pul1 is effective. For a normal mode operation, switching control signal Vg is reset to turn OFF switch M1 when current sense signal IS is larger than peak current threshold Vcs, and switching control signal Vg is set to turn ON switch M1 when pulse signal Pul2 is effective.

Protection unit 346 is employed to provide necessary protections for switch mode power supply 300 to improve reliability and stability. In one embodiment, protection unit 346 provides an over voltage protection (OVP) based on auxiliary power supply Vcc, an over load protection (OLP) based on feedback signal VFB, and a short circuit protection (SCP) based on current sense signal IS. One with ordinary skill in the art should also understand that protection unit 346 may provide any other suitable protection, such as an over temperature protection. In one embodiment, an output terminal of protection unit 346 is coupled to drive signal management unit 347 to turn OFF switch M1 for protection.

In one embodiment, control circuit 34 is integrated on an integrated chip (IC). In another embodiment, control circuit 34 may comprise discrete components.

Figure 4:
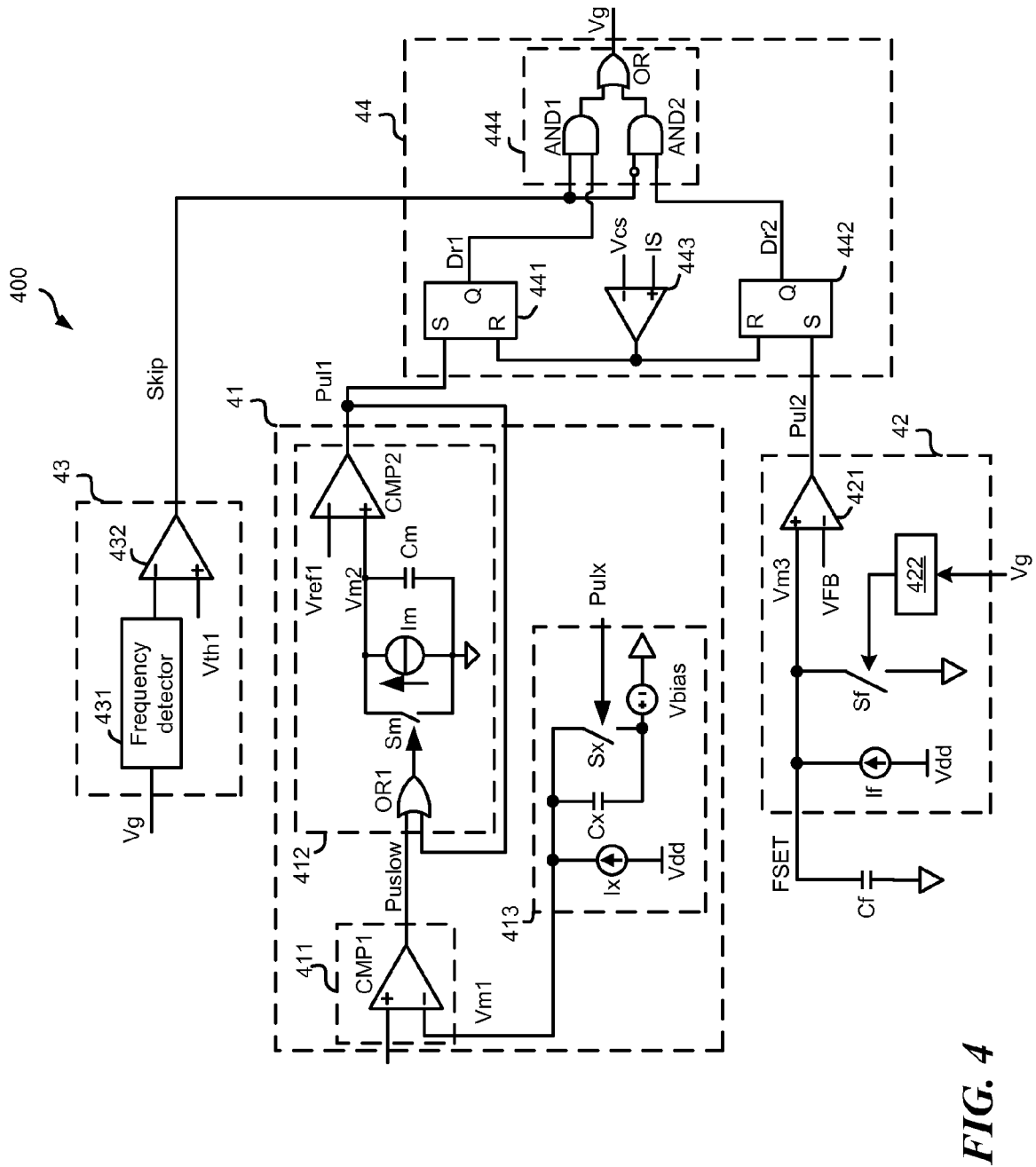
FIG. 4 schematically illustrates a detailed control circuit 400 for control circuit 34 shown in FIG. 3 according to an embodiment of the present invention.

FIG. 4 schematically illustrates a detailed control circuit 400 for control circuit 34 shown in FIG. 3 according to an embodiment of the present invention. Control circuit 400 comprises a skip cycle mode control unit 41, a normal mode control unit 42, a mode management unit 43 and a drive signal management unit 44.

Skip cycle mode control unit 41 comprises a low-frequency pulse generator 411, a mix-frequency pulse generator 412 and a modulation signal generator 413.

Low-frequency pulse generator 411 comprises a comparator CMP1. Comparator CMP1 provides low-frequency pulse signal Puslow via comparing feedback signal VFB with modulation signal Vm1. In one embodiment, a non-inverting terminal of comparator CMP1 is configured to receive feedback signal VFB, an inverting terminal of comparator CMP1 is configured to receive modulation signal Vm1, and an output terminal of comparator CMP1 is configured to provide low-frequency pulse signal Puslow, wherein low-frequency pulse signal Puslow has a same frequency with modulation signal Vm1, i.e., the first frequency. In one embodiment, when feedback signal VFB is larger than modulation signal Vm1, low-frequency pulse signal Puslow is in a first state, e.g., high voltage level, and when feedback signal VFB is less than modulation signal Vm1, low-frequency pulse signal Puslow is in a second state, e.g., low voltage level.

Mix-frequency pulse generator 412 is configured to receive low-frequency pulse signal Puslow and provide pulse signal Pul1. Mix-frequency pulse generator 412 is configured to provide a modulation signal Vm2 based on low-frequency pulse signal Puslow. Mix-frequency pulse generator 412 comprises a capacitor Cm, a current source Im, a switch Sm, and a comparator CMP2. Capacitor Cm, current source Im and switch Sm are coupled in parallel and capacitor Cm is charged and discharged alternately by current source Im and switch Sm, wherein a voltage across capacitor Cm is modulation signal Vm2. In one embodiment, a first terminal of capacitor Cm is coupled to a non-inverting terminal of comparator CMP2, and a second terminal of capacitor Cm is coupled to the primary ground. A first terminal of current source Im is coupled to the first terminal of capacitor Cm to charge capacitor Cm, and a second terminal of current source Im is coupled to the second terminal of capacitor Cm. A control terminal of switch Sm is configured to receive low-frequency pulse signal Puslow, and switch Sm is turned ON and turned OFF by low-frequency pulse signal Puslow. Capacitor Cm is charged by current source Im when switch Sm is turned OFF and capacitor Cm is discharged through switch Sm when switch Sm is turned ON. The non-inverting terminal of comparator CMP2 is coupled to the first terminal of capacitor Cm to receive modulation signal Vm2, an inverting terminal of comparator CMP2 is configured to receive a reference signal Vref1, and an output terminal of comparator CMP2 is configured to provide pulse signal Pul1 via comparing modulation signal Vm2 with reference signal Vref1. In one embodiment, pulse signal Pul1 keeps high voltage level when modulation signal Vm2 is larger than reference signal Vref1, and pulse signal Pul1 keeps low voltage level when modulation signal Vm2 is less than reference signal Vref1.

In one embodiment, mix-frequency pulse generator 412 further comprises an OR gate OR1, and the control terminal of switch Sm is coupled to low-frequency pulse signal Puslow and pulse signal Pul1 through OR gate OR1. In one embodiment, switch Sm is turned ON when low-frequency pulse signal Puslow or pulse signal Pul1 is high voltage level, and switch Sm is turned OFF when low-frequency pulse signal Puslow and pulse signal Pul1 are both low voltage level.

Modulation signal generator 413 is configured to provide modulation signal Vm1 with the first frequency. Modulation signal Vm1 may be a triangle wave signal with a DC bias or a saw-tooth wave signal with a DC bias. Referring to FIG. 4, modulation signal generator 413 comprises a current source Ix, a capacitor Cx and a switch Sx. A first terminal of current source Ix is configured to receive a power supply Vdd, a second terminal of current source Ix is coupled to a first terminal of capacitor Cx, and a second terminal of capacitor Cx is coupled to the primary ground through a bias voltage Vbias. The first terminal of capacitor Cx is coupled to low-frequency pulse generator 411 to provide modulation signal Vm1. Switch Sx is coupled to capacitor Cx in parallel. A control terminal of switch Sx is configured to receive a low-frequency pulse signal Pulx having the first frequency. Switch Sx is turned ON and OFF by low-frequency pulse signal Pulx. In one embodiment, low-frequency pulse signal Pulx is provided by comparing a 200 Hz saw-tooth wave signal with a voltage level. Capacitor Cx is charged and discharged alternately through current source Ix and switch Sx. When switch Sx is turned ON, capacitor Cx is discharged through switch Sx until modulation signal Vm1 equals to bias voltage Vbias. When switch Sx is turned OFF, capacitor Cx is charged by current source Ix, and then modulation signal Vm1 increases. In one embodiment, a DC bias of modulation signal Vm1 equals to feedback signal VFB when switching frequency of switch M1 equals to the second frequency. The first frequency is set by a current supplied by current source Ix and a capacitance of capacitor Cx. In one embodiment, the first frequency decreases when the capacitance of capacitor Cx increases. In one embodiment, the first frequency increases when the current supplied by current source Ix increases.

Feedback signal VFB increases when load 35 becomes lighter. When feedback signal increases to the DC bias of modulation signal Vm1, low-frequency pulse signal Puslow and modulation signal Vm1 has the same frequency, and then a duty cycle of low-frequency pulse signal Puslow increases with increasing of feedback signal VFB. When low-frequency pulse signal Puslow is in the first state (e.g., high voltage level), modulation signal Vm2 is low voltage level and pulse signal Pul1 is ineffective, e.g., low voltage level; and when low-frequency pulse signal Puslow is in the second state (e.g., low voltage level), modulation signal Vm2 is effective and has the second frequency, and pulse signal Pul1 comprises effective pulses having the second frequency. The second frequency is set by a current supplied by current source Im and a capacitance of capacitor Cm.

Normal mode control unit 42 is configured to provide pulse signal Pul2. Referring to FIG. 4, normal mode control unit 42 comprises a current source If, a switch Sf and a comparator 421. Capacitor Cf is coupled between frequency setting pin FSET and the primary ground. A first terminal of current source If is configured to receive power supply Vdd, and a second terminal of current source If is coupled to one terminal of capacitor Cf to charge capacitor Cf. In one embodiment, capacitor Cf may be integrated into normal mode control unit 42. Switch Sf is coupled to capacitor Cf in parallel. A control terminal of switch Sf is configured to receive switching control signal Vg. When switch Sf is turned ON, capacitor Cf is discharged through switch Sf, a voltage Vm3 at frequency setting pin FSET decreases; and when switch Sf is turned OFF, capacitor Cf is charged by current source If, voltage Vm3 at frequency setting pin FSET increases. In one embodiment, switching control signal Vg is coupled to the control terminal of switch Sf through a pulse circuit 422. When switching control signal Vg is at a rising edge, pulse circuit 422 provides a pulse signal to turn ON switch Sf during a short time period, and capacitor Cf is discharged. For example, the pulse signal has 0.6 us effective time period. In one embodiment, switching control signal Vg may be coupled to the control terminal of switch Sf directly.

Referring to FIG. 4, a non-inverting terminal of comparator 421 is coupled to frequency setting pin FSET, an inverting terminal of comparator 421 is coupled to feedback pin FB to receive feedback signal VFB, and an output terminal of comparator 421 is configured to provide pulse signal Pul2. A frequency of pulse signal Pul2 is related with capacitor Cf, current source If and feedback signal VFB. The frequency of pulse signal Pul2 decreases with increasing of feedback signal VFB. In one embodiment, the inverting terminal of comparator 421 may be coupled to a fixed voltage level, and as a result, the frequency of pulse signal Pul2 is independent with feedback signal VFB, i.e., the frequency of pulse signal Pul2 is independent with the load condition. In another embodiment, the inverting terminal of comparator 421 is coupled to a larger one of feedback signal VFB and a fixed voltage level, and as a result, the frequency of pulse signal Pul2 is independent with the load condition for a heavier load and the frequency of pulse signal Pul2 decreases with increasing of feedback signal for a lighter load.

Mode management unit 43 comprises a frequency detector 431 and a comparator 432. Frequency detector 431 comprises an input terminal configured to receive switching control signal Vg and an output terminal configured to provide a frequency detecting signal based on switching control signal Vg. A non-inverting terminal of comparator 432 is configured to receive a frequency threshold Vth1, an inverting terminal of comparator 432 is coupled to the output terminal of frequency detector 431, and an output terminal of comparator 432 is configured to provide mode control signal Skip via comparing switching frequency of switch M1 with frequency threshold Vth1. When switching frequency of switch M1 is larger than frequency threshold Vth1, mode control signal Skip is low voltage level to control switch mode power supply 300 works in the normal mode; and when switching frequency of switch M1 is less than frequency threshold Vth1, mode control signal Skip is high voltage level to control switch mode power supply 300 works in the skip cycle mode.

Drive signal management unit 44 comprises a flip-flop 441, a flip-flop 442, a comparator 443 and a logic circuit 444. A non-inverting terminal of comparator 443 is configured to receive current sense signal IS, an inverting terminal of comparator 443 is configured to receive peak current threshold Vcs. In one embodiment, peak current threshold Vcs is a fixed voltage level signal. In one embodiment, peak current threshold Vcs varies with feedback signal VFB. A set terminal (S) of flip-flop 441 is coupled to the output terminal of skip cycle mode control unit 41 to receive pulse signal Pul1, a reset terminal (R) of flip-flop 441 is coupled to the output terminal of comparator 443, and an output terminal of flip-flop 441 is configured to provide a driving signal Dr1. A frequency of driving signal Dr1 equals to the frequency of pulse signal Pul1. A set terminal (S) of flip-flop 442 is coupled to the output terminal of normal mode control unit 42 to receive pulse signal Pul2, a reset terminal (R) of flip-flop 442 is coupled to the output terminal of comparator 443, and an output terminal of flip-flop 442 is configured to provide a driving signal Dr2. A frequency of driving signal Dr2 equals to the frequency of pulse signal Pul2. Logic circuit 444 is configured to receive driving signal Dr1, driving signal Dr2 and mode control signal Skip, and is configured to provide switching control signal Vg based on driving signal Dr1, driving signal Dr2 and mode control signal Skip. As shown in FIG. 4, switching control signal Vg equals to driving signal Dr1 when mode control signal Skip is high voltage level, and switching control signal vg equals to driving signal Dr2 when mode control signal Skip is low voltage level. In one embodiment, logic circuit 444 comprises an AND gate AND1, an AND gate AND2 and an OR gate OR. A first input terminal of gate AND1 is coupled to the output terminal of mode management unit 43 to receive mode control signal Skip, and a second input terminal of gate AND1 is coupled to the output terminal of flip-flop 441 to receive driving signal Dr1. A first input terminal of gate AND2 is coupled to the output terminal of mode management unit 43 to receive mode control signal Skip through an inverter, and a second input terminal of gate AND2 is coupled to the output terminal of flip-flop 442 to receive driving signal Dr2. A first input terminal of gate OR is coupled to an output terminal of gate AND1, a second input terminal of gate OR is coupled to an output terminal of gate AND2, and an output terminal of gate OR is configured to provide switching control signal Vg. However, one with ordinary skill in the art should appreciate that logic circuit 444 may also comprise any other suitable circuit, such as a multiplexer.

Figure 5:
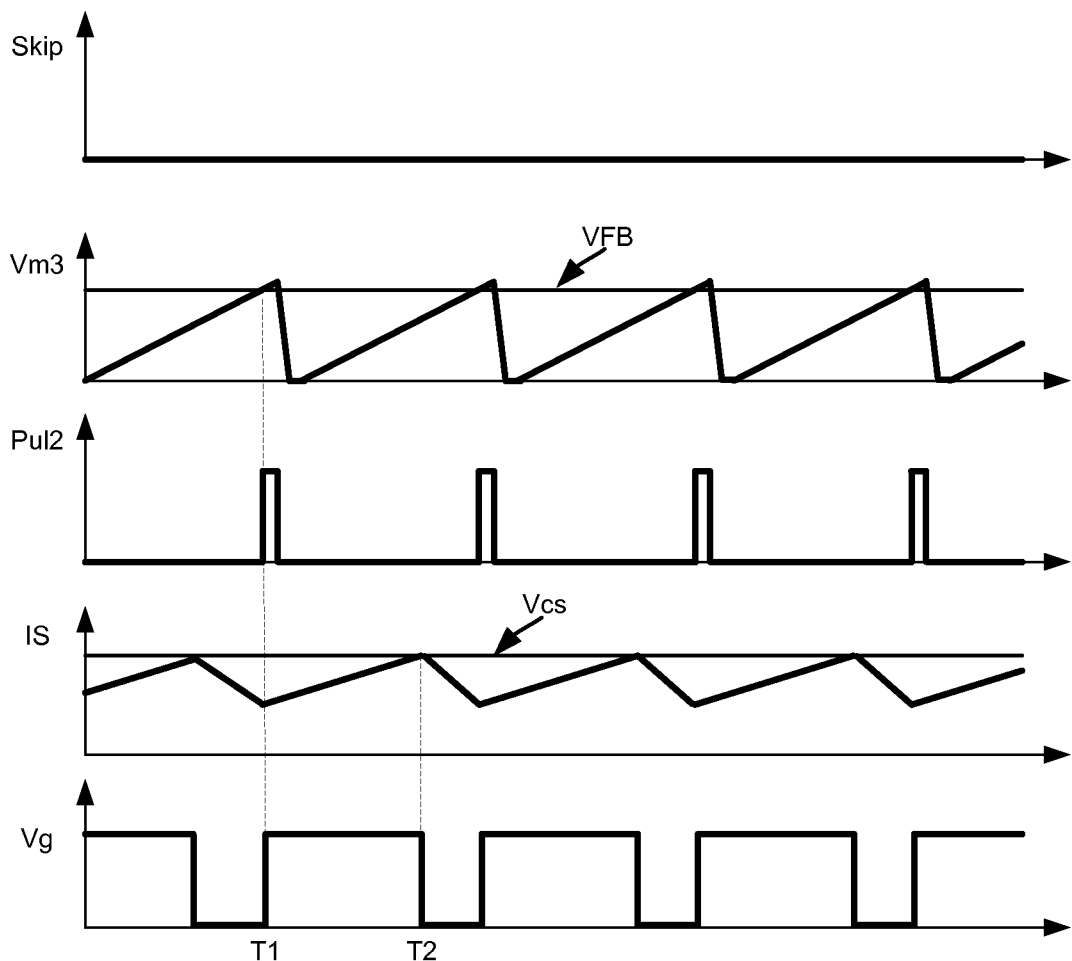
FIG. 5 shows waveforms of control circuit 400 shown in FIG. 4 under a normal mode operation according to an embodiment of the present invention.

FIG. 5 shows waveforms of control circuit 400 shown in FIG. 4 under the normal mode operation according to an embodiment of the present invention. As shown in FIG. 5, mode control signal Skip keeps low voltage level for the normal mode operation, and control circuit 400 provides switching control signal Vg based on pulse signal Pul2. At time T1, when voltage Vm3 at frequency setting pin FSET is larger than feedback signal VFB, pulse signal Pul2 becomes high voltage level to set flip-flop 442, then switching control signal Vg becomes high voltage level to turn ON switch M1. Current IL flowing through switch M1 increases, and current sense signal IS increases accordingly. At time T2, current sense signal IS is larger than peak current threshold Vcs, flip-flop 442 is reset to provide low voltage level switching control signal Vg to turn OFF switch M1.

In one embodiment, feedback signal VFB increases and switching frequency of switch M1 decreases to improve efficiency when load 35 becomes lighter, i.e., when output current Io decreases.

Figure 6:
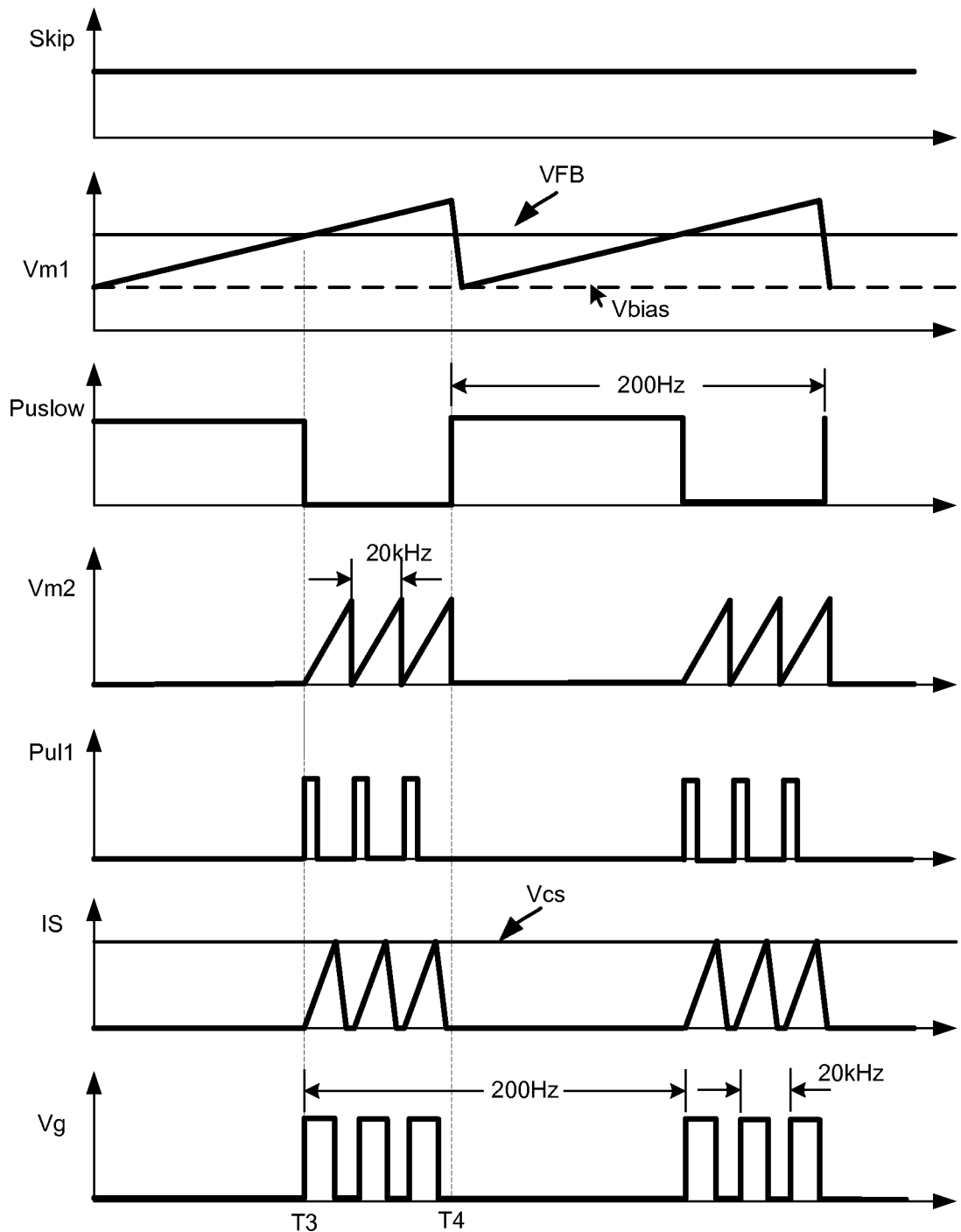
FIG. 6 shows waveforms of control circuit 400 shown in FIG. 4 under a skip cycle mode operation according to an embodiment of the present invention.

FIG. 6 shows waveforms of control circuit 400 shown in FIG. 4 under the skip cycle mode operation according to an embodiment of the present invention. As shown in FIG. 6, mode control signal Skip keeps high voltage level for the skip cycle mode operation. Control circuit 400 is configured to provide switching control signal Vg based on pulse signal Pul1. Modulation signal Vm1 is a saw-tooth wave signal having the first frequency (e.g., 200 Hz), and modulation signal Vm1 has DC bias voltage Vbias. When modulation signal Vm1 is less than feedback signal VFB, low-frequency pulse signal Puslow keeps high voltage level, capacitor Cm is discharged through switch Sm, modulation signal Vm2 keeps low voltage level, as a result, pulse signal Pul1 keeps low voltage level, i.e., ineffective, and switching control signal Vg is ineffective to keep switch M1 OFF. When modulation signal Vm1 is larger than feedback signal VFB at time T3, low-frequency pulse signal Puslow becomes low voltage level, capacitor Cm is charged and discharged alternatively to provide modulation signal Vm2 having the second frequency (e.g., 20 KHz), as a result, pulse signal Pul1 provides effective pulses having the second frequency, and switching control signal Vg controls switch M1 ON with the second frequency. When pulse signal Pul1 is high voltage level, flip-flop 441 is set to provide high voltage level switching control signal Vg to turn ON switch M1. Current IL flowing through switch M1 increases, and current sense signal IS increases accordingly until current sense signal IS is larger than peak current threshold Vcs, flip-flop 441 is reset, switching control signal Vg becomes low voltage level to turn OFF switch M1.

Output voltage Vout of switch mode power supply 300 is regulated via adjusting the duty cycle of low-frequency pulse signal Puslow for the skip cycle mode operation. In one embodiment, the duty cycle of low-frequency pulse signal Puslow increases with increasing of feedback signal VFB, i.e., a time period during which low-frequency pulse signal Puslow keeps high voltage level increases with increasing of feedback signal VFB, as a result, a time period pulse signal Pul1 maintaining ineffective increases, and a time period switch M1 maintaining OFF increases.

Figure 7:
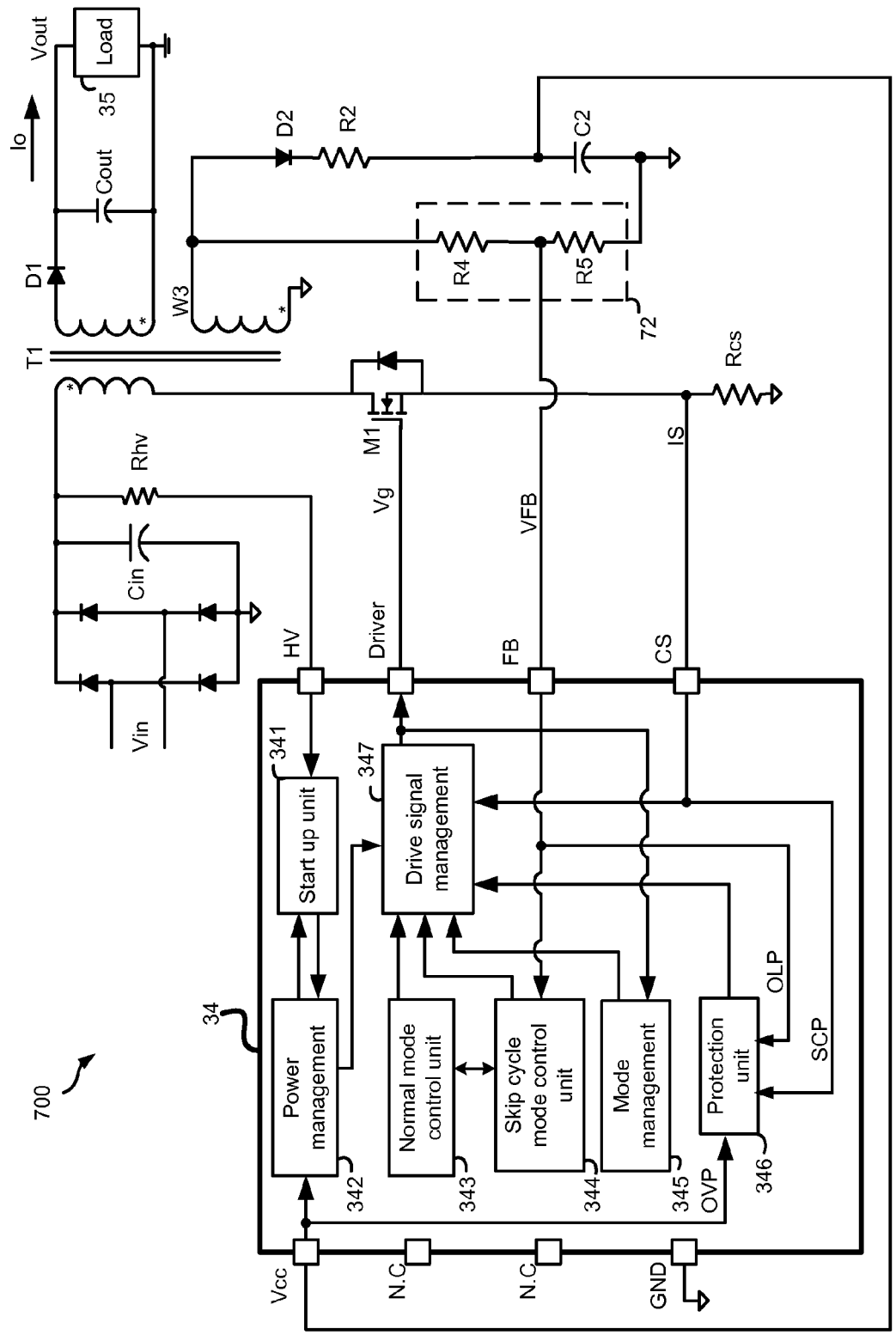
FIG. 7 schematically illustrates a circuit diagram of a switch mode power supply 700 according to an embodiment of the present invention.

FIG. 7 schematically illustrates a circuit diagram of a switch mode power supply 700 according to an embodiment of the present invention. Switch mode power supply 700 shown in FIG. 7 employs a primary side control method. Be different with switch mode power supply 300, switch mode power supply 700 comprises a feedback circuit 72 coupled to auxiliary winding W3 to provide feedback signal VFB. Feedback circuit 72 is configured to sense output voltage Vout via testing the voltage across auxiliary winding W3. When switch M1 is turned ON, energy is stored in the primary winding of transformer T1; and when switch M1 is turned OFF, energy is transferred to the secondary winding of transformer T1. At the beginning of a demagnetization period, the voltage across auxiliary winding W3 is related with output voltage Vout and a forward voltage Vf of diode D1; and at the ending of the demagnetization period, the voltage across auxiliary winding W3 is related with output voltage Vout. At the ending of the demagnetization period, a voltage Vaux across auxiliary winding W3 is expressed by equation (1):

$$V_{aux} = N_{aux} * V_{out} / N_s \quad (1)$$

where, Naux is number of turns of auxiliary winding W3, and Ns is number of turns of the secondary winding of transformer T1.

As shown in FIG. 7, feedback circuit 72 comprises a resistor divider comprising a resistor R4 and a resistor R5. A first terminal of resistor R4 is coupled to one terminal of auxiliary winding W3, a second terminal of resistor R4 is coupled to a first terminal of resistor R5, and a second terminal of resistor R5 is coupled to the primary ground. A voltage at a common node of resistor R4 and resistor R5 representing feedback signal VFB. In another embodiment, feedback circuit 72 may comprise a capacitor divider.

Figure 8:
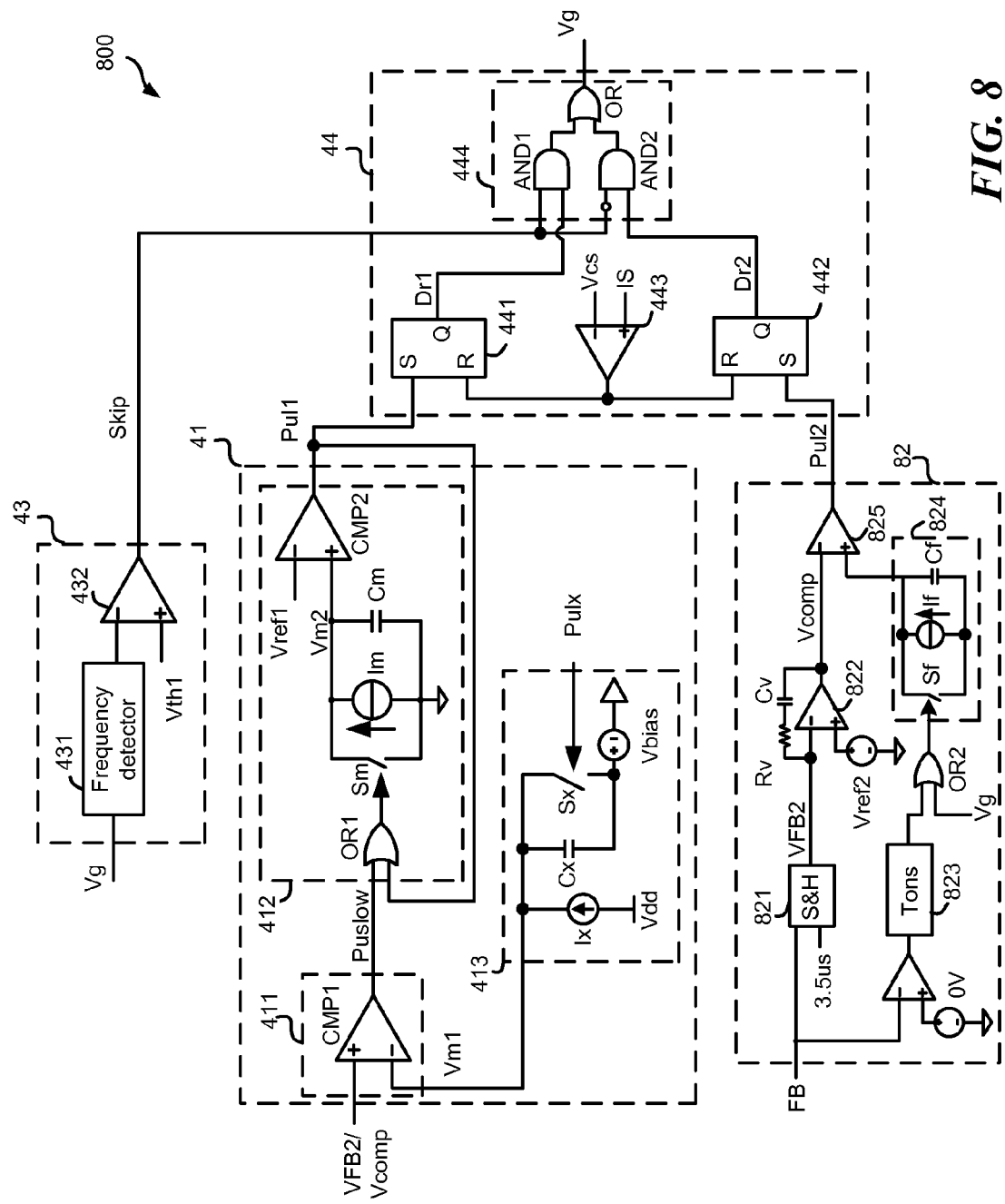
FIG. 8 schematically illustrates a detailed control circuit 800 for control circuit 34 shown in FIG. 7 according to an embodiment of the present invention.

FIG. 8 schematically illustrates a detailed control circuit 800 for control circuit 34 shown in FIG. 7 according to an embodiment of the present invention. Similar with control circuit 400, control circuit 800 comprises skip cycle mode control unit 41, a normal mode control unit 82, mode management unit 43 and drive signal management unit 44. Only differences between control circuit 800 and control circuit 400 are described below for simplification.

Normal mode control unit 82 is coupled to feedback pin FB, and provides pulse signal Pul2 whose frequency varies with load 35. Normal mode control unit 82 comprises a sample and hold circuit 821, an amplifier 822, an on-time detector 823, a modulation signal generator 824 and a comparator 825. Comparator 825 comprises a non-inverting terminal, an inverting terminal and an output terminal, wherein the non-inverting terminal is coupled to an output terminal of modulation signal generator 824, the inverting terminal is coupled to feedback pin FB through sample and hold circuit 821, and the output terminal is configured to provide pulse signal Pul2 to turn ON switch M1. Sample and hold circuit 821 is coupled to feedback pin FB to receive feedback signal VFB provided by feedback circuit 72, and is configured to provide feedback signal VFB2 after a sample and hold operation. Referring to FIG. 8, a compensation signal Vcomp generated by feedback signal VFB2 through a compensation circuit comprising an amplifier 822, a resistor Rv and a capacitor Cv is coupled to the inverting terminal of comparator 825. Modulation signal generator 824 comprises a switch Sf, a current source If and a capacitor Cf. Switch Sf, current source If and capacitor Cf are coupled in parallel. Capacitor Cf is charged and discharged alternately by current source If and switch Sf, and capacitor Cf is configured to provide a modulation signal. On-time detector 823 is configured to detect an on-time period Tons of diode D1. In one embodiment, switch Sf is turned ON to discharge capacitor Cf when switch M1 is turned ON or diode D1 is turned ON; and switch Sf is turned OFF, and capacitor Cf is charged when switch M1 is turned OFF and diode D1 is turned OFF.

Skip cycle mode control unit 41 is configured to receive feedback signal VFB2 or compensation signal Vcomp, and is configured to provide low-frequency pulse signal Puslow via comparing feedback signal VFB2 or compensation signal Vcomp with modulation signal Vm1, and as a result, switch M1 maintains OFF when low-frequency pulse signal Puslow is high voltage level, and switch M1 is turned ON with the second frequency when low-frequency pulse signal Puslow is low voltage level.

Figure 9:
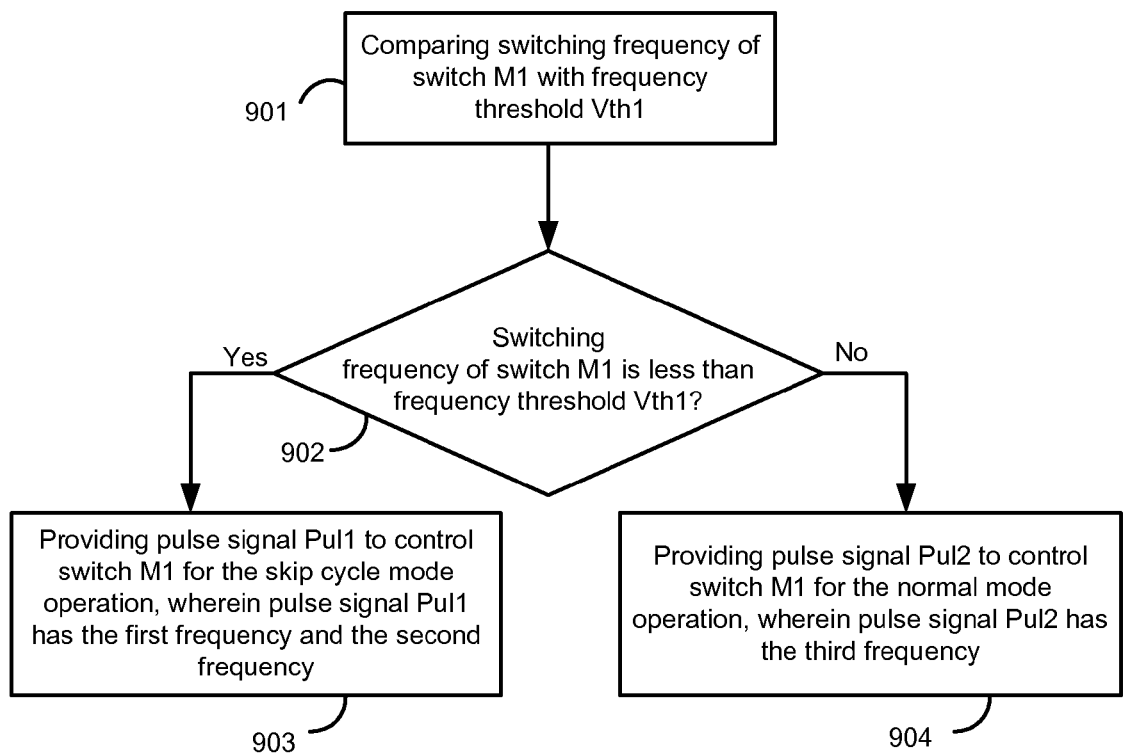
FIG. 9 shows a flow chart illustrating a control method with reference to switch mode power supply 300 according to an embodiment of the present invention.

FIG. 9 shows a flow chart illustrating a control method with reference to switch mode power supply 300 according to an embodiment of the present invention. The control method comprises steps 901-904. In step 901, comparing the switching frequency of switch M1 with frequency threshold Vth1. In step 902, determining a working mode for switch mode power supply 300. When switching frequency of switch M1 is less than frequency threshold Vth1, then go to step 903 for the skip cycle mode operation. When switching frequency of switch M1 is larger than frequency threshold Vth1, then go to step 904 for the normal mode operation. In step 903, for the skip cycle mode operation, providing pulse signal Pul1 to turn ON and turn OFF switch M1, wherein pulse signal Pul1 has the first frequency and the second frequency. In step 904, for the normal mode operation, providing pulse signal Pul2 to turn ON and turn OFF switch M1, wherein pulse signal Pul2 has the third frequency. In one embodiment, the third frequency is larger than the second frequency, and the third frequency varies with load 35.

In one embodiment, the control method for switch mode power supply 300 further comprises providing current sense signal IS via testing current IL flowing through switch M1, and turning OFF switch M1 via comparing current sense signal IS with peak current threshold Vcs. In one embodiment, when current sense signal IS is larger than peak current threshold Vcs, then turn OFF switch M1. Peak current threshold Vcs may be a predetermined voltage level or a real-time adjusted signal.

In one embodiment, the skip cycle mode operation further comprises providing low-frequency pulse signal Puslow having the first frequency, and providing pulse signal Pul1 having the first frequency and the second frequency based on low-frequency pulse signal Puslow, where the second frequency is larger than the first frequency. The duty cycle of low-frequency pulse signal Puslow is adjusted with feedback signal VFB to adjust output voltage Vout of switch mode power supply 300. In one embodiment, low-frequency pulse signal Puslow is generated by comparing feedback signal VFB with a modulation signal. When feedback signal VFB is larger than the modulation signal, low-frequency pulse signal Puslow is in the first state and pulse signal Pul1 keeps ineffective to maintaining switch M1 OFF. When feedback signal VFB is less than the modulation signal, low-frequency pulse signal Puslow is in the second state and pulse signal Pul1 provides effective pulses having the second frequency to turn switch M1 ON with the second frequency. In one embodiment, the first frequency may be equal to the lower limit of the audible frequency range. In another embodiment, the first frequency is less than the lower limit of the audible frequency range. In one embodiment, the second frequency may be equal to the upper limit of the audible frequency range, i.e., 20 KHz. In another embodiment, the second frequency is larger than the upper limit of the audible frequency range.

In one embodiment, for the normal mode operation, pulse signal Pul2 turns ON switch M1 with the third frequency. In one embodiment, the third frequency varies with the load condition. The third frequency may decrease when output voltage Vout increases, and the third frequency may increase when output voltage Vout decreases.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

We claim:

1. A control circuit for controlling a switch mode power supply, the switch mode power supply having an output terminal configured to provide an output voltage and having a first switch with a control terminal, wherein the control circuit comprising:
   a mode management unit, having an input terminal and an output terminal, wherein the output terminal of the mode management unit is configured to provide a mode control signal;
   a skip cycle mode control unit, having an input terminal and an output terminal, wherein the input terminal of the skip cycle mode control unit is configured to receive a feedback signal representing the output voltage, wherein the output terminal of the skip cycle mode control unit is configured to provide a first pulse signal having a first frequency and a second frequency, wherein the first frequency and the second frequency are predetermined;
   a normal mode control unit, having an output terminal configured to provide a second pulse signal; and
   a drive signal management unit, having a first input terminal, a second input terminal, a third input terminal and an output terminal, wherein the first input terminal of the drive signal management unit is coupled to the output terminal of the mode management unit, the second input terminal of the drive signal management unit is coupled to the output terminal of the skip cycle mode control unit, the third input terminal of the drive signal management unit is coupled to the output terminal of the normal mode control unit, and the output terminal of the drive signal management unit is configured to provide a switching control signal to the control terminal of the first switch based on the first pulse signal, the second pulse signal and the mode control signal; wherein
   the input terminal of the mode management unit is configured to receive the switching control signal, and the output terminal of the mode management unit is configured to provide the mode control signal via comparing a frequency of the switching control signal with a frequency threshold.

2. The control circuit of claim 1, wherein the drive signal management unit is configured to provide the switching control signal based on the first pulse signal when the mode control signal is in a first state, and the drive signal management unit is configured to provide the switching control signal based on the second pulse signal when the mode control signal is in a second state.

3. The control circuit of claim 1, wherein the skip cycle mode control unit is configured to provide the first pulse signal based on a low-frequency pulse signal, wherein a duty cycle of the low-frequency pulse signal is adjusted with the feedback signal.

4. The control circuit of claim 1, wherein the skip cycle mode control unit further comprising:
   a low-frequency pulse generator, having a first input terminal, a second input terminal and an output terminal, wherein the first input terminal of the low-frequency pulse generator is configured to receive the feedback signal, the second input terminal of the low-frequency pulse generator is configured to receive a modulation signal, and the output terminal of the low-frequency pulse generator is configured to provide a low-frequency pulse signal via comparing the feedback signal with the modulation signal, and wherein the low-frequency pulse signal is in a first state when the feedback signal is larger than the modulation signal, and the low-frequency pulse signal is in a second state when the feedback signal is less than the modulation signal; and a mix-frequency pulse generator, having an input terminal and an output terminal, wherein the input terminal of the mix-frequency pulse generator is coupled to the output terminal of the low-frequency pulse generator, and the output terminal of the mix-frequency pulse generator is configured to provide the first pulse signal based on the low-frequency pulse signal, and wherein the first pulse signal keeps ineffective when the low-frequency pulse signal is in the first state, and the first pulse signal comprises effective pulses having the second frequency when the low-frequency pulse signal is in the second state.

5. The control circuit of claim 4, wherein the mix-frequency pulse generator further comprising:

a first capacitor, having a first terminal and a second terminal;

an OR gate, having a first input terminal, a second input terminal and an output terminal, wherein the first input terminal of the OR gate is configured to receive the low-frequency pulse signal, the second input terminal of the OR gate is configured to receive the first pulse signal;

a first controlling switch, having a first terminal, a second terminal and a control terminal, wherein the first terminal of the first controlling switch is coupled to the first terminal of the first capacitor, the second terminal of the first controlling switch is coupled to the second terminal of the first capacitor, and the control terminal of the first controlling switch is coupled to the output terminal of the OR gate;

a first current source, configured to charge the first capacitor; and a first comparator, configured to provide the first pulse signal via comparing a voltage across the first capacitor with a reference signal.

6. The control circuit of claim 1, wherein the first frequency is equal to or below a lower limiter of an audible frequency range, and the second frequency is equal to or above an upper limiter of the audible frequency range.

7. The control circuit of claim 1, wherein the drive signal management unit is configured to turn OFF the first switch by the switching control signal when a current flowing through the first switch is larger than a peak current threshold.

8. The control circuit of claim 1, wherein the normal mode control unit further comprising:

a second capacitor, having a first terminal and a second terminal;

a second current source, configured to charge the second capacitor;

a second controlling switch, having a first terminal, a second terminal and a control terminal, wherein the first terminal of the second controlling switch is coupled to the first terminal of the second capacitor, the second terminal of the second controlling switch is coupled to the second terminal of the second capacitor, and the control terminal of the second controlling switch is configured to receive the switching control signal; and a second comparator, having a first input terminal, a second input terminal and an output terminal, wherein the first input terminal of the second comparator is coupled to the first terminal of the second capacitor, the second input terminal of the second comparator is configured to receive the feedback signal, and the output terminal is configured to provide the second pulse signal.

9. The control circuit of claim 1, wherein the drive signal management unit further comprising:

a third comparator, having a first input terminal, a second input terminal and an output terminal, wherein the first input terminal of the third comparator is configured to receive a current sense signal representing a current flowing through the first switch, the second input terminal of the third comparator is configured to receive a peak current threshold;

a first flip-flop, having a reset terminal, a set terminal, and an output terminal, wherein the reset terminal of the first flip-flop is coupled to the output terminal of the third comparator, the set terminal of the first flip-flop is coupled to the output terminal of the skip cycle mode control unit to receive the first pulse signal;

a second flip-flop, having a reset terminal, a set terminal, and an output terminal, wherein the reset terminal of the second flip-flop is coupled to the output terminal of the third comparator, the set terminal of the second flip-flop is coupled to the output terminal of the normal mode control unit to receive the second pulse signal; and a logic circuit, having a first input terminal, a second input terminal, a third input terminal and an output terminal, wherein the first input terminal of the logic circuit is couple to the output terminal of the first flip-flop, the second input terminal of the logic circuit is coupled to the output terminal of the second flip-flop, the third input terminal of the logic circuit is coupled to the output terminal of the mode management unit, and the output terminal of the logic circuit is coupled to the control terminal of the first switch to provide the switching control signal.

10. A switch mode power supply, having an output terminal configured to provide an output voltage, wherein the switch mode power supply comprising:

a first switch, having a control terminal;

a feedback circuit, configured to provide a feedback signal based on the output voltage; and a control circuit, configured to receive the feedback signal and provide a switching control signal to the control terminal of the first switch; and wherein when the switch mode power supply works in a skip cycle mode for a light load condition, the control circuit is configured to provide the switching control signal based on a first pulse signal having a first frequency and a second frequency, wherein the first frequency and the second frequency are predetermined; and when the switch mode power supply works in a normal mode for a non-light load condition, the control circuit is configured to provide the switching control signal based on a second pulse signal; wherein the control circuit is configured to provide a mode control signal via comparing a frequency of the switching control signal with a frequency threshold, and the control circuit is configured to control the switch mode power supply working in the skip cycle mode or in the normal mode based on the mode control signal.

11. The switch mode power supply of claim 10, wherein the control circuit further comprising:

a mode management unit, configured to provide the mode control signal;

a skip cycle mode control unit, configured to provide the first pulse signal based on a low-frequency pulse signal having the first frequency, wherein a duty cycle of the low-frequency pulse signal is adjusted based on the feedback signal;

a normal mode control unit, configured to provide the second pulse signal based on the feedback signal; and a drive signal management unit, configured to provide the switching control signal based on the first pulse signal when the mode control signal is in a first state, and configured to provide the switching control signal based on the second pulse signal when the mode control signal is in a second state.

12. The switch mode power supply of claim 11, wherein the skip cycle mode control unit further comprising:
   a low-frequency pulse signal generator, configured to provide the low-frequency pulse signal via comparing the feedback signal with a modulation signal; and
   a mix-frequency pulse generator, configured to provide the first pulse signal based on the low-frequency pulse signal, wherein the first pulse signal keeps ineffective when the low-frequency pulse signal is in a first state, and the first pulse signal comprises effective pulses having the second frequency when the low-frequency pulse signal is in a second state.

13. The switch mode power supply of claim 10, wherein when the switch mode power supply works in the normal mode, a pulse width modulation or a fixed on-time variable off-time control is used.

14. The switch mode power supply of claim 10, wherein the first frequency is equal to or below a lower limiter of an audible frequency range.

15. The switch mode power supply of claim 10, wherein the second frequency is equal to or above an upper limiter of an audible frequency range.

16. A control method for a switch mode power supply, the switch mode power supply having a first switch and an output terminal configured to provide an output voltage, the control method comprising:
   providing a feedback signal based on the output voltage of the switch mode power supply;
   comparing a switching frequency of the first switch with a frequency threshold;
   when the switching frequency of the first switch is less than the frequency threshold, the switch mode power supply works in a skip cycle mode, the first switch is controlled based on a first pulse signal, wherein the first pulse signal has a first frequency and a second frequency, and wherein the second frequency is higher than the first frequency; and
   when the switching frequency of the first switch is larger than the frequency threshold, the switch mode power supply works in a normal mode, the first switch is controlled based on a second pulse signal, wherein the second pulse signal has a third frequency, and wherein the third frequency is higher than the second frequency.

17. The control method of claim 16, further comprising providing the first pulse signal based on a low-frequency pulse signal, wherein the low-frequency pulse signal has the first frequency.

18. The control method of claim 16, wherein the switch mode power supply works in the skip cycle mode further comprising:
   providing a low-frequency pulse signal via comparing the feedback signal with a modulation signal;
   when the feedback signal is larger than the modulation signal, the low-frequency pulse signal is in a first state, and the first pulse signal keeps ineffective to maintain the first switch OFF; and
   when the feedback signal is less than the modulation signal, the low-frequency pulse signal is in a second state, the first pulse signal comprises effective pulses having the second frequency, and the first switch is turned ON with the second frequency.

19. The control method of claim 16, wherein the first frequency is equal to or below a lower limiter of an audible frequency range, and wherein the second frequency is equal to or above an upper limiter of the audible frequency range.

* * * * *